United States Patent
Wainscott et al.

(10) Patent No.: US 10,545,066 B2
(45) Date of Patent: Jan. 28, 2020

(54) LEAK DETECTION TOOL

(71) Applicant: Caterpillar Inc., Peoria, IL (US)

(72) Inventors: Nicholas Edwin Wainscott, Rossville, IN (US); Jack Albert Merchant, West Lafayette, IN (US); Andrew Loetz, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 374 days.

(21) Appl. No.: 15/379,629

(22) Filed: Dec. 15, 2016

(65) Prior Publication Data
US 2018/0172543 A1 Jun. 21, 2018

(51) Int. Cl.
G01M 3/02 (2006.01)
G01M 3/26 (2006.01)
G01M 3/28 (2006.01)
F02M 21/02 (2006.01)
F02M 65/00 (2006.01)

(52) U.S. Cl.
CPC ........ G01M 3/025 (2013.01); F02M 21/0245 (2013.01); F02M 65/006 (2013.01); G01M 3/26 (2013.01); G01M 3/28 (2013.01); G01M 3/2846 (2013.01); Y02T 10/32 (2013.01)

(58) Field of Classification Search
CPC .............................. G01M 3/025; G01M 3/28
USPC ...................................................... 73/40.5 R
See application file for complete search history.

(56) References Cited

U.S. PATENT DOCUMENTS

| | | | |
|---|---|---|---|
| 8,997,715 B2 | 4/2015 | Worthington et al. | |
| 2004/0200457 A1* | 10/2004 | Gottemoller | F02M 55/002 123/468 |
| 2007/0079810 A1* | 4/2007 | Usui | F02M 55/04 123/467 |
| 2012/0291752 A1* | 11/2012 | Hackett | F02M 43/04 123/445 |
| 2014/0283788 A1 | 9/2014 | Bleyer | |

FOREIGN PATENT DOCUMENTS

| | | |
|---|---|---|
| CN | 204344272 | 5/2015 |
| DE | 10245389 | 4/2004 |
| DE | 102006035296 | 2/2008 |
| DE | 102008015611 | 10/2009 |
| WO | 2009147291 | 12/2009 |

* cited by examiner

Primary Examiner — Justin Seo
Assistant Examiner — Rodney T Frank
(74) Attorney, Agent, or Firm — Oblon, McClelland, Maier & Neustadt (57) ABSTRACT

A leak detection tool for a double walled fuel rail system is provided. The tool includes a body having a first end and a second end distal with respect to the first end. The tool includes a first passage extending from the first end at least partially towards the second end. The tool includes a second passage axially aligned with and extending from the first passage towards the second end. The tool includes a seat defined at an intersection of the first passage and the second passage. The tool also includes a sealing element provided in association with the seat within the second passage. The tool further includes a spring element provided within the second passage and in contact with the sealing element. The first end is configured to block fluid communication between outer passages of adjacent portions of the double walled fuel rail system.

12 Claims, 4 Drawing Sheets

LEAK DETECTION TOOL

TECHNICAL FIELD

The present disclosure relates to a leak detection tool. More particularly, the present disclosure relates to the leak detection tool for a double walled fuel rail system.

BACKGROUND

Generally, engines running on gaseous fuel such as Liquefied Natural Gas (LNG) employ a double walled fuel rail system in order to comply to safety regulations concerning engines with gaseous fuel systems. A leak detection process for such a double walled fuel rail system is a time intensive process requiring disassembly of the complete fuel rail system from the engine.

For example, in order to find a leak within the fuel rail system, the leak detection process would include disassembly of a section of the fuel rail system. Another section of the fuel rail system that may remain on the engine may be sealed and pressurized. In a situation, when the pressure within the remaining section may drop over a period of time, an additional section of the fuel rail system may have to be disassembled. Another section of the fuel rail system remaining on the engine may have to be pressure tested again until the section having the leak may be identified.

Such leak detection process may have a potential of introducing another leak within the fuel rail system due to the required disassembly of each section of the fuel rail system. As a result, every section of the fuel rail system that may be disassembled may have to be carefully reassembled with appropriate seals, and may have to be tested again after reassembly in order to check for a new leak that may have been introduced due to the leak detection process. Hence, there is a need for an improved tool and method for detecting the leak within the double walled fuel rail system.

U.S. Pat. No. 8,997,715 describes a fuel system for supplying fuel to an internal combustion engine. The engine includes a fuel system having a connector for connecting a single-walled high pressure common rail to a double-walled fuel line segment, and a fluid containment system. Each embodiment includes drain plumbing having a leakage drain connector that may be used to provide an interface between a single-walled high pressure common rail and a double-walled high pressure fuel line segment, and also provide part of a low pressure passage fluidly connected with a low pressure passage of the double-walled high pressure fuel line segment. The drain plumbing may also provide an interface with a low pressure fuel drain line fluidly coupled to a leakage detector.

SUMMARY OF THE DISCLOSURE

In an aspect of the present disclosure, a leak detection tool for a double walled fuel rail system is provided. The leak detection tool includes a body having a first end and a second end distal with respect to the first end. The leak detection tool includes a first passage extending from the first end at least partially towards the second end. The leak detection tool includes a second passage axially aligned with and extending from the first passage towards the second end. The leak detection tool includes a seat defined at an intersection of the first passage and the second passage. The leak detection tool also includes a sealing element provided in association with the seat within the second passage. The leak detection tool further includes a spring element provided within the second passage and in contact with the sealing element. The spring element is configured to move the sealing element between a seated position and a lifted position. The first end is configured to block fluid communication between outer passages of adjacent portions of the double walled fuel rail system.

In another aspect of the present disclosure, a double walled fuel rail system is provided. The double walled fuel rail system includes a first portion having a first inner tube, a first outer tube surrounding the first inner tube, and a first outer passage disposed between the first inner tube and the first outer tube. The double walled fuel rail system also includes a second portion coupled to the first portion. The second portion includes a second inner tube, a second outer tube surrounding the second inner tube, and a second outer passage disposed between the second inner tube and the second outer tube. The double walled fuel rail system further includes a leak detection tool disposed between the first portion and the second portion. The leak detection tool includes a body having a first end and a second end distal with respect to the first end. The leak detection tool includes a first passage extending from the first end at least partially towards the second end. The leak detection tool includes a second passage axially aligned with and extending from the first passage towards the second end. The leak detection tool includes a seat defined at an intersection of the first passage and the second passage. The leak detection tool also includes a sealing element provided in association with the seat within the second passage. The leak detection tool further includes a spring element provided within the second passage and in contact with the sealing element. The spring element is configured to move the sealing element between a seated position and a lifted position. The first end is configured to block fluid communication between the first outer passage and the second outer passage.

In yet another aspect of the present disclosure, a method for performing a leak test of a double walled fuel rail system is provided. The double walled fuel rail system includes a first outer passage provided in fluid communication with a second outer passage associated with a first portion and a second portion respectively. The method includes providing a leak detection tool between the first outer passage and the second outer passage. The method includes blocking the fluid communication between the first outer passage and the second outer passage by the leak detection tool. The method also includes pressurizing the first outer passage with a pressurized fluid. The method further includes detecting a leak within the first outer passage based on a pressure drop within the first outer passage.

Other features and aspects of this disclosure will be apparent from the following description and the accompanying drawings.

DETAILED DESCRIPTION

Figure 1:
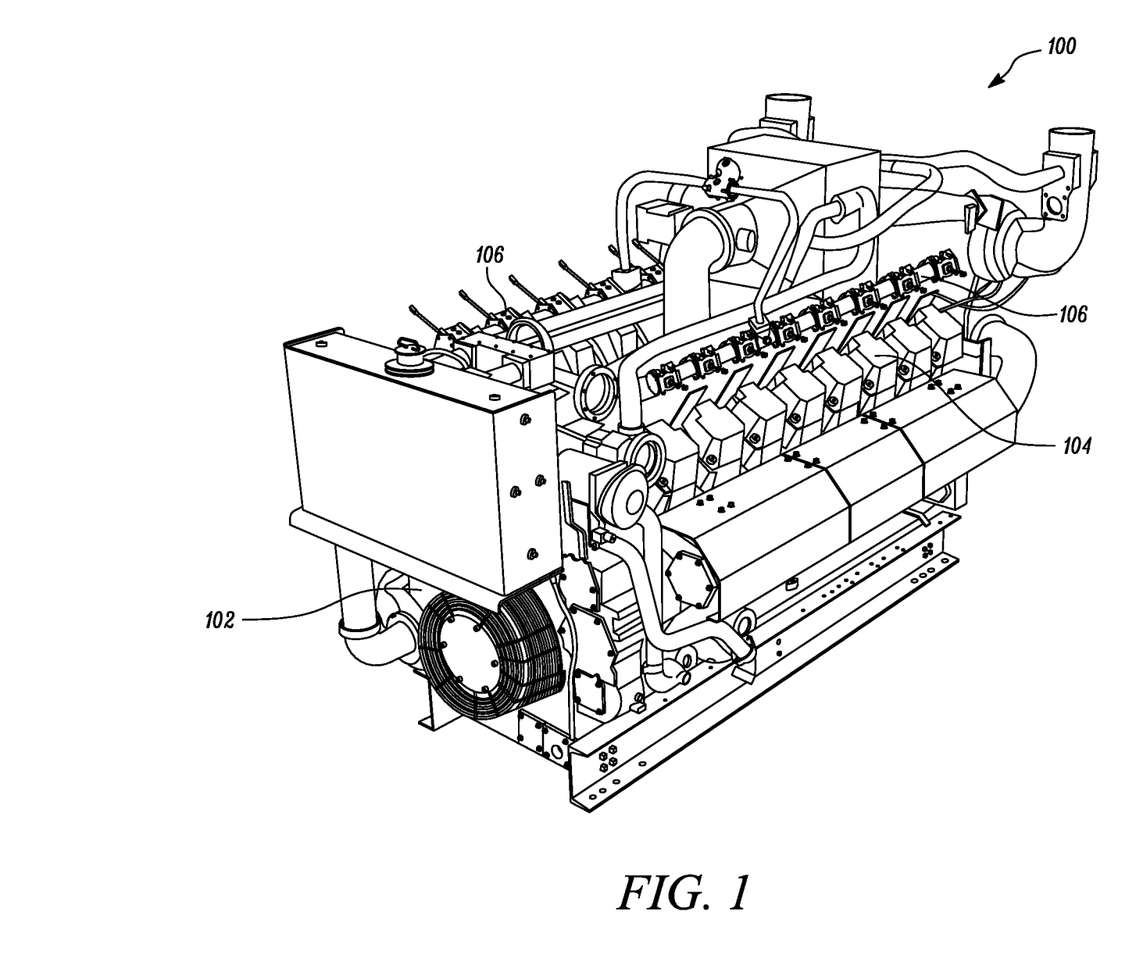
FIG. 1 is a perspective view of an exemplary engine, according to one embodiment of the present disclosure.

Wherever possible, the same reference numbers will be used throughout the drawings to refer to the same or the like parts. Referring to FIG. 1, an exemplary engine 100 is illustrated. The engine 100 may be an internal combustion engine powered by a gaseous fuel such as, Liquefied Natural Gas (LNG). It should be recognized that the concepts of the present disclosure may be suitably applicable to any type and configuration of the engine 100. In one embodiment, the engine 100 may be employed by a machine (not shown). The engine 100 and/or the machine may be used for applications including, but not limited to, power generation, transportation, construction, agriculture, forestry, aviation, marine, material handling, and waste management.

The engine 100 includes an engine block 102. The engine block 102 includes one or more cylinders (not shown) provided therein. The cylinders may be arranged in any configuration such as inline, radial, "V", and so on. The engine 100 further includes a piston (not shown) movably disposed within each of the cylinders. Each of the pistons may be coupled to a crankshaft (not shown) of the engine 100. Energy generated from combustion of the fuel inside the cylinders may be converted to rotational energy of the crankshaft by the pistons.

The engine 100 also includes a cylinder head 104 mounted on the engine block 102. The cylinder head 104 may house one or more components and/or systems (not shown) of the engine 100 such as a valve train, an intake manifold, an exhaust manifold, sensors, and so on. Additionally, the engine 100 may include various other components and/or systems (not shown) such as a crankcase, a fuel system, an air system, a cooling system, a turbocharger, an exhaust gas recirculation system, an exhaust gas aftertreatment system, and so on.

The engine 100 also includes a fuel rail system 106. More specifically, the fuel rail system 106 is a double walled type of a fuel rail system. The fuel rail system 106 is fluidly coupled to a fuel pump (not shown). Accordingly, the fuel rail system 106 is configured to receive pressurized gaseous fuel therein from the fuel pump. The fuel rail system 106 is further fluidly coupled to one or more fuel injectors (not shown) associated with the cylinders of the engine 100. Accordingly, the fuel rail system 106 is configured to supply the pressurized gaseous fuel to each of the fuel injectors associated with the cylinders of the engine 100.

Figure 2:
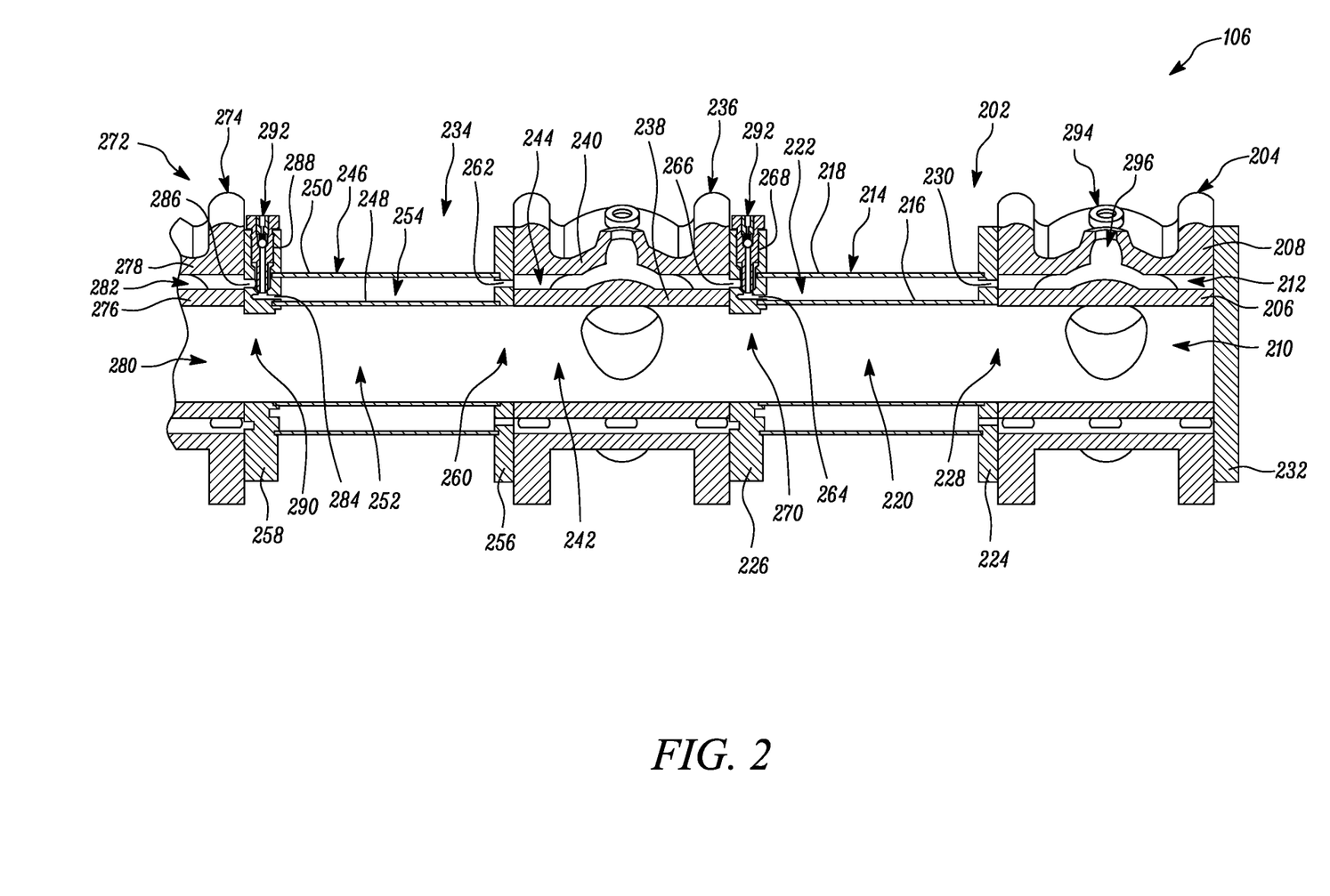
FIG. 2 is a partial cross sectional view of a fuel rail system of the engine of FIG. 1, according to one embodiment of the present disclosure.

Referring to FIG. 2, a cross sectional view of a portion of the fuel rail system 106 is illustrated. The fuel rail system 106 includes a first portion 202. The first portion 202 includes a first housing 204. The first housing 204 is configured to enclose one or more components of a valve (not shown) associated with the fuel rail system 106, such as a Gas Admission Valve (GAV). The first housing 204 includes a first inner housing 206 and a first outer housing 208. The first inner housing 206 defines a first housing inner passage 210 therethrough. The first outer housing 208 is spaced apart with respect to the first inner housing 206 and surrounds the first inner housing 206. Accordingly, the first housing 204 includes a first housing outer passage 212 disposed between the first inner housing 206 and the first outer housing 208.

The first portion 202 also includes a first tube 214. The first tube 214 includes a first inner tube 216 and a first outer tube 218. The first inner tube 216 defines a first tube inner passage 220 therethrough. The first outer tube 218 is spaced apart with respect to the first inner tube 216 and surrounds the first inner tube 216. Accordingly, the first tube 214 includes a first tube outer passage 222 disposed between the first inner tube 216 and the first outer tube 218. The first tube 214 also includes a first flange 224 and a second flange 226 provided on opposing ends of the first tube 214 respectively.

The first flange 224 includes a first flange inner passage 228 and a first flange outer passage 230. The first flange 224 is configured to couple the first tube 214 to one end of the first housing 204. Accordingly, the first housing inner passage 210 is provided in fluid communication with the first tube inner passage 220 through the first flange inner passage 228. Also, the first housing outer passage 212 is provided in fluid communication with the first tube outer passage 222 through the first flange outer passage 230. Another end of the first housing 204 is sealed by using a sealing flange 232.

The fuel rail system 106 also includes a second portion 234. The second portion 234 has a configuration similar to the configuration of the first portion 202. Accordingly, the second portion 234 includes a second housing 236 similar to the first housing 204. The second housing 236 is configured to enclose one or more components of the valve associated with the fuel rail system 106, such as the Gas Admission Valve (GAV). The second housing 236 includes a second inner housing 238 and a second outer housing 240. The second inner housing 238 defines a second housing inner passage 242 therethrough. The second outer housing 240 is spaced apart with respect to the second inner housing 238 and surrounds the second inner housing 238. Accordingly, the second housing 236 includes a second housing outer passage 244 disposed between the second inner housing 238 and the second outer housing 240.

The second portion 234 also includes a second tube 246 similar to the first tube 214. Accordingly, the second tube 246 includes a second inner tube 248 and a second outer tube 250. The second inner tube 248 defines a second tube inner passage 252 therethrough. The second outer tube 250 is spaced apart with respect to the second inner tube 248 and surrounds the second inner tube 248. Accordingly, the second tube 246 includes a second tube outer passage 254 disposed between the second inner tube 248 and the second outer tube 250. The second tube 246 also includes a first flange 256 and a second flange 258 provided on opposing ends of the second tube 246 respectively.

The first flange 256 and the second flange 258 of the second tube 246 are similar to the first flange 224 and the second flange 226 of the first tube 214 respectively. Accordingly, the first flange 256 includes a first flange inner passage 260 and a first flange outer passage 262. The first flange 256 is configured to couple the second tube 246 to one end of the second housing 236. Accordingly, the second housing inner passage 242 is provided in fluid communication with the second tube inner passage 252 through the first flange inner passage 260. Also, the second housing outer passage 244 is provided in fluid communication with the second tube outer passage 254 through the first flange outer passage 262. Another end of the second housing 236 is coupled to the first tube 214 via the second flange 226 of the first tube 214. Accordingly, the second portion 234 is coupled to the first portion 202.

The second flange 226 of the first tube 214 includes a first annular groove 264 and a second annular groove 266 provided thereon. The first annular groove 264 and the second annular groove 266 are provided on opposing ends of the second flange 226. The first annular groove 264 is provided in fluid communication with the first tube outer passage 222. The second annular groove 266 is provided in fluid communication with the second housing outer passage 244. Also, the first annular groove 264 and the second annular groove 266 are provided with an offset with respect to each other. Further, the second flange 226 includes a bore 268 provided radially therein. The bore 268 is provided in communication with the first annular groove 264 and the second annular groove 266. The second flange 226 also includes a second flange inner passage 270. Accordingly, the first tube inner passage 220 is provided in fluid communication with the second housing inner passage 242 through the second flange inner passage 270.

Additionally, the fuel rail system 106 also includes a third portion 272. The third portion 272 has a configuration similar to the configuration of the first portion 202 and the second portion 234. Accordingly, the third portion 272 includes a third housing 274 similar to the first housing 204 and the second housing 236. The third housing 274 includes a third inner housing 276 and a third outer housing 278. Accordingly, the third housing 274 defines a third housing inner passage 280 and a third housing outer passage 282.

The third portion 272 may also include a third tube (not shown) similar to the first tube 214 and the second tube 246. Accordingly, the third tube may include a third inner tube, a third outer tube, a third tube inner passage, a third tube outer passage, a first flange, a first flange inner passage, a first flange outer passage, a second flange, a first annular groove, a second annular groove, and a second flange inner passage. The first flange may be configured to couple the third tube to one end of the third housing 274. Another end of the third housing 274 is coupled to the second tube 246 via the second flange 258 of the second tube 246. Accordingly, the third portion 272 is coupled to the second portion 234.

The second flange 258 of the second tube 246 is similar to the second flange 226 of the first tube 214. Accordingly, the second flange 258 includes a first annular groove 284 provided in fluid communication with the second tube outer passage 254, a second annular groove 286 provided in fluid communication with the third housing outer passage 282, and a bore 288 provided in communication with the first annular groove 284 and the second annular groove 286. The second flange 258 also includes a second flange inner passage 290. Accordingly, the second tube inner passage 252 is provided in fluid communication with the third housing inner passage 280 through the second flange inner passage 290. Further, the fuel rail system 106 may also include additional portions (not shown), such as a fourth portion, a fifth portion, a sixth portion, and so on similar to the first portion 202, the second portion 234 and/or the third portion 272, without limiting the scope of the disclosure. The number of portions of the fuel rail system 106 may vary be based on application requirements.

The first housing inner passage 210, the first flange inner passage 228, the first tube inner passage 220, the second flange inner passage 270, the second housing inner passage 242, the first flange inner passage 260, the second tube inner passage 252, the second flange inner passage 290, the third housing inner passage 280, and so on are configured to receive the pressurized gaseous fuel therein from the fuel pump. The outer passages of the fuel rail system 106, such as the first housing outer passage 212, the first flange outer passage 230, the first tube outer passage 222, the first annular groove 264, the bore 268, and the second annular groove 266 of the second flange 226, the second housing outer passage 244, the first flange outer passage 262, the second tube outer passage 254, the first annular groove 284, the bore 288, and the second annular groove 286 of the second flange 258, the third housing outer passage 282, and so on are configured to receive a pressurized inert gas therein.

The pressure of the inert gas in the outer passages is higher than the pressure of the gaseous fuel within the inner passages of the fuel rail system 106. Any leakage present within the inner passages of the fuel rail system 106 may limit exit of the gaseous fuel into the outer passages of the fuel rail system 106 due to the higher pressure of the inert gas in the outer passages relative to the pressure of the gaseous fuel in the inner passages. Accordingly, exfiltration of the gaseous fuel to atmosphere or the outer passages from the inner passages of the fuel rail system 106 is limited.

In some embodiments, the outer passages of the fuel rail system 106 may receive a flow of air therethrough. A pressure of the air within the outer passages may be relatively lesser than the pressure of the gaseous fuel within the inner passages of the fuel rail system 106. In such a situation, any leakage present within the inner passages of the fuel rail system 106 may result in exit of the gaseous fuel into the outer passages of the fuel rail system 106. The leaked gaseous fuel may be further carried through the outer passages along with the flow of the air to any downstream components for recovery of the leaked gaseous fuel from the flow of the air or safe exit to atmosphere.

The fuel rail system 106 includes a leak detection tool 292. The leak detection tool 292 may be hereinafter interchangeably referred to as the "tool 292". The tool 292 is disposed between adjacent portions of the fuel rail system 106 during a leak test of the fuel rail system 106. For example, the tool 292 may be disposed between the first portion 202 and the second portion 234, and/or between the second portion 234 and the third portion 272, and/or between the third portion 272 and the fourth portion, and so on. More specifically, the tool 292 is disposed within the bore 268, 288 of the second flange 226, 258 of at least one the first tube 214, the second tube 246, the third tube, and so on. The tool 292 will now be explained in detail with reference to the second flange 226 of the first tube 214. It should be noted that the tool 292 may be similarly employed in other second flange 258 of the second tube 246, the third tube, and so on.

Figure 3A:
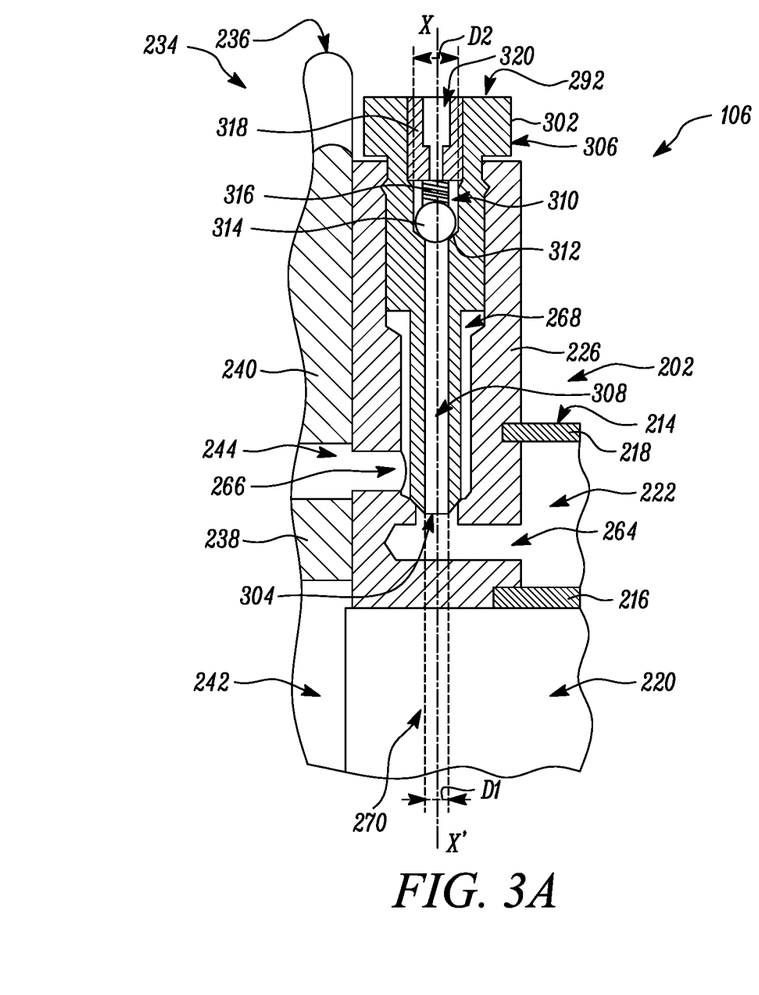
FIG. 3A is a partial cross sectional view of a flange of the fuel rail system of FIG. 2 showing a leak detection tool installed therein, according to one embodiment of the present disclosure.

Referring to FIG. 3A, the tool 292 includes a body 302. The body 302 has a hollow and elongated configuration defining an axis X-X'. The body 302 includes a first end 304 and a second end 306 thereof. The second end 306 is distal with respect to the first end 304. The body 302 includes a first passage 308 provided along the axis X-X'. The first passage 308 extends from the first end 304 at least partially towards the second end 306. The first passage 308 defines a first diameter "D1" thereof.

The body 302 also includes a second passage 310 axially aligned with respect to the first passage 308 along the axis X-X'. The second passage 310 extends from the first passage 308 towards the second end 306. The second passage 310 defines a second diameter "D2" thereof. The first diameter "D1" is smaller than the second diameter "D2". Accordingly, an intersection of the first passage 308 and the second passage 310 defines a seat 312 within the body 302. The tool 292 also includes a sealing element 314 provided in association with the seat 312 within the second passage 310. The tool 292 further includes a spring element 316 disposed within the second passage 310 and in contact with the sealing element 314. The spring element 316 is configured to move the sealing element 314 between a seated position and a lifted position based on a predefined pressure threshold.

The seated position and the lifted position of the sealing element 314 will be explained in more detail later. In the seated position of the sealing element 314, the first passage 308 is fluidly disconnected with respect to the second passage 310. In the lifted position of the sealing element 314, the first passage 308 is in fluid communication with the second passage 310. Also, the first passage 308 may be provided in fluid communication with any one of the first tube outer passage 222 and the second housing outer passage 244. In the illustrated embodiment, the first passage 308 is provided in fluid communication with the first tube outer passage 222 through the first annular groove 264. In other embodiments, the first passage 308 may be provided in fluid communication with the second housing outer passage 244 through the second annular groove 266 based on design and application requirements.

Additionally, the tool 292 includes an end piece 318 provided within the second passage 310. The end piece 318 is configured to contact and hold the spring element 316 within the second passage 310. The end piece 318 also includes a through hole 320 provided therein. The hole 320 is provided in fluid communication with the second passage 310. Accordingly, in the lifted position of the sealing element 314, the hole 320 is in fluid communication with the first passage 308 through the second passage 310 and the seat 312. In the seated position of the sealing element 314, the hole 320 is disconnected with respect to the first passage 308 through the seat 312.

The tool 292 is disposed within the bore 268 of the second flange 226 in a manner such that the first end 304 of the tool 292 blocks fluid communication between the first annular groove 264 and the second annular groove 266. More specifically, in an installed position of the tool 292 within the bore 268 of the second flange 226, the first end 304 of the tool 292 blocks fluid communication between the outer passages of the adjacent portions of the fuel rail system 106, such as the first tube outer passage 222 and the second housing outer passage 244 of the first portion 202 and the second portion 234 respectively.

In the illustrated embodiment, the body 302 of the tool 292 includes a varying outer diameter along the axis X-X'. In other embodiments, the body 302 may include a single outer diameter along the axis X-X' based on design requirements. Accordingly, the bore 268 of the second flange 226 may include a configuration similar to an outer configuration of the body 302 of the tool 292. The tool 292 is removably affixed within the bore 268 of the second flange 226 using force fit. In other embodiments, the tool 292 may be removably affixed within the bore 268 using any fastening methods known in the art, such as bolting, screw fitting, welding, and so on.

Also, it should be noted that the tool 292 may be provided within the bores 268, 288 of the second flanges 226, 258 of one or more of the first tube 214, the second tube 246, the third tube, and so on during the leak test of the respective adjacent portions of the fuel rail system 106. During regular operation of the fuel rail system 106 and/or the engine 100, the bores 268, 288 of the second flanges 226, 258 of one or more of the first tube 214, the second tube 246, the third tube, and so on may be removably sealed using a suitable plug 322 as shown disposed in the second flange 226 of the first tube 214 with reference to FIG. 3B.

Figure 3B:
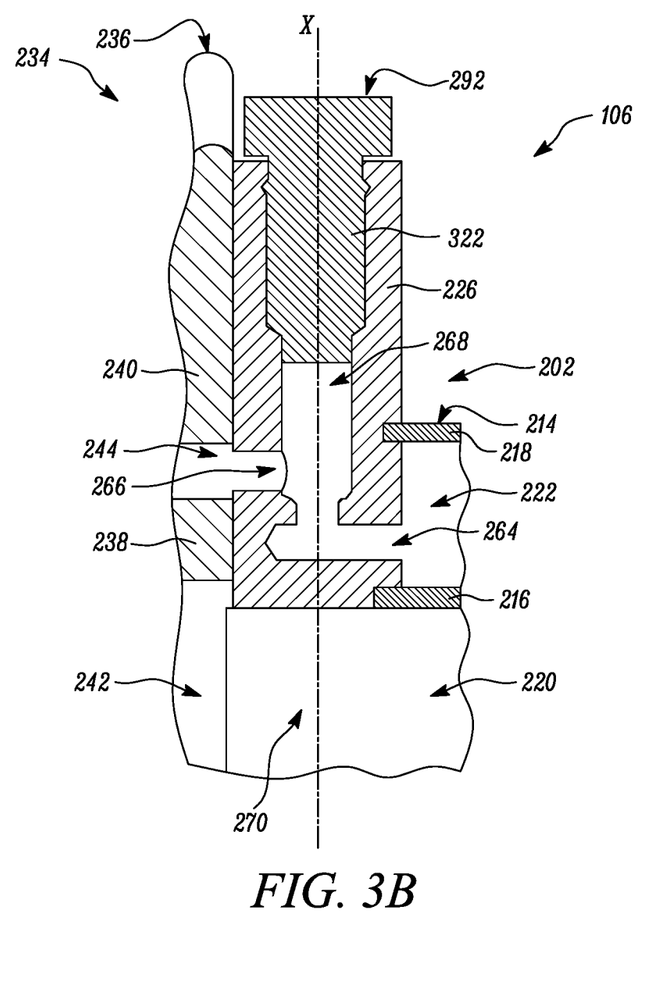
FIG. 3B is another partial cross sectional view of the flange of FIG. 3B showing a plug installed therein, according to one embodiment of the present disclosure.

With the plug 322 assembled within the bore 268 of the second flange 226, the first annular groove 264 is in fluid communication with the second annular groove 266 in turn providing fluid communication between the outer passages of the adjacent portions, such as the first tube outer passage 222 and the second housing outer passage 244 of the first portion 202 and the second portion 234 respectively. Also, the plug 322 limits venting of the pressurized inert gas through the bore 268 during regular operation of the fuel rail system 106 and/or the engine 100.

INDUSTRIAL APPLICABILITY

Figure 4:
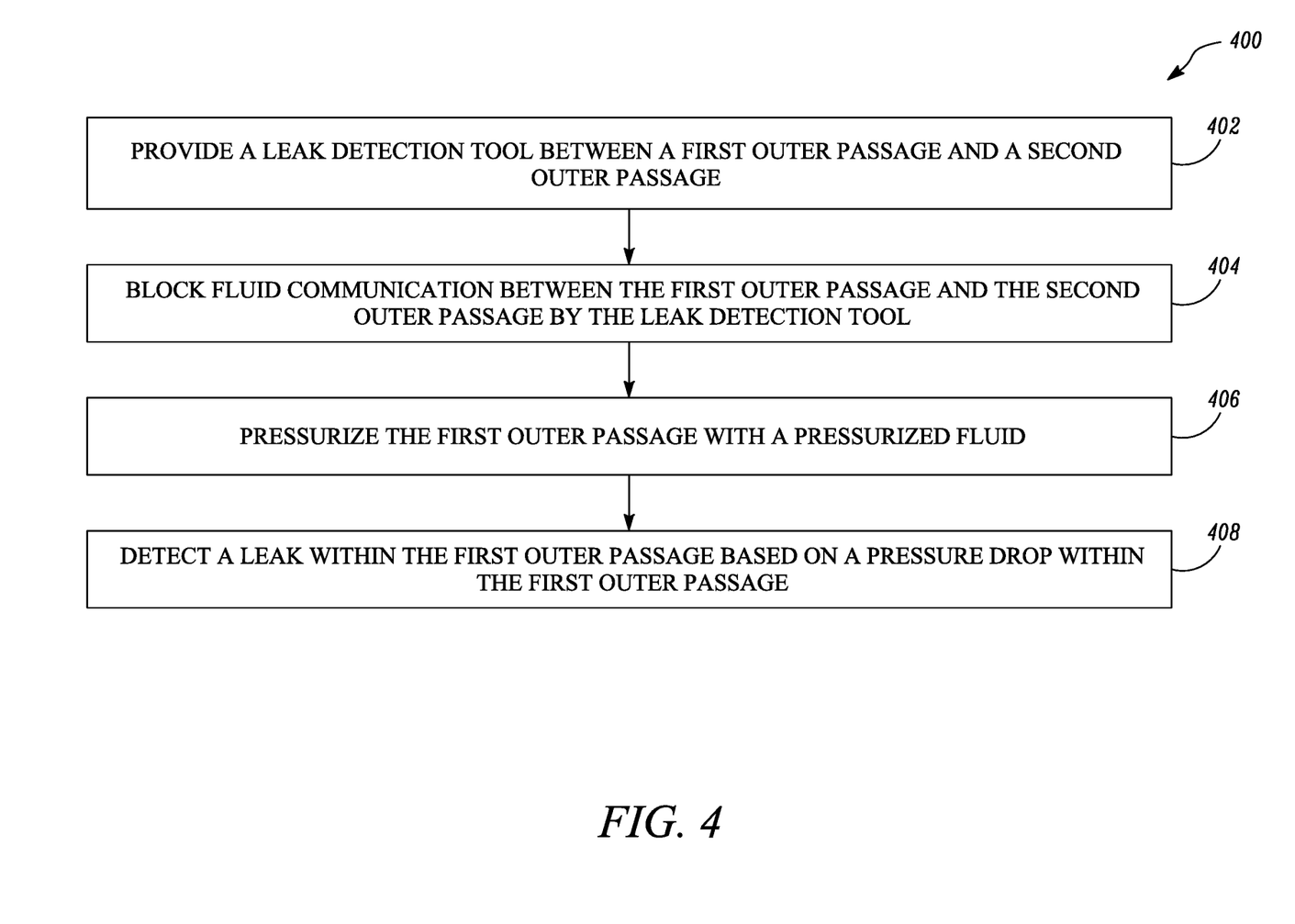
FIG. 4 is a flowchart illustrating a method of performing a leak test using the leak detection tool of FIG. 3A, according to one embodiment of the present disclosure.

The present disclosure relates to a method 400 of performing the leak test of the fuel rail system 106 using the leak detection tool 292. Referring to FIG. 4, a flowchart of the method 400 is illustrated. The method 400 will now be described with reference to the first portion 202 and the second portion 234. It should be noted that the method 400 may be similarly employed for the leak test of other portions of the fuel rail system 106, such as the third portion 272, the fourth portion, and so on.

At step 402, the leak detection tool 292 is provided between the first tube outer passage 222 and the second housing outer passage 244. More specifically, the tool 292 is provided within the bore 268 of the second flange 226 of the first tube 214. At step 404, the fluid communication between the first tube outer passage 222 and the second housing outer passage 244 is blocked by the tool 292. More specifically, the first end 304 of the tool 292 blocks the fluid communication between the first annular groove 264 and the second annular groove 266.

At step 406, the outer passages of the first portion 202, such as the first housing outer passage 212 and the first tube outer passage 222 are pressurized using a pressurized fluid. The fluid may be any fluid known in the art, such as the inert gas, air, and so on. The first housing outer passage 212 and the first tube outer passage 222 may be pressurized using any pressuring tool, such as a compressor, through a hole 294 (shown in FIG. 2) associated with the first portion 202. Further, after pressurizing the outer passages of the first portion 202, the pressure within the first housing outer passage 212 and the first tube outer passage 222 is monitored for a predefined time interval. The pressure may be monitored using any known pressure gauge or pressure sensor connected to the first portion 202 through a hole 296 (shown in FIG. 2) associated with the first portion 202.

At step 408, a leak may be detected in the first portion 202 of the fuel rail system 106 based on a drop of the pressure of the fluid within the outer passages of the first portion 202 during the predefined time interval. In a situation when the pressure of the fluid within the outer passages of the first portion 202 may remain constant during the predefined time interval, it may be determined that the leak may not be present in the first portion 202 of the fuel rail system 106.

Accordingly, the tool 292 may be disassembled from the second flange 226 of the first tube 214 and may be installed within the second flange 258 of the second tube 246. The bore 268 of the second flange 226 of the first tube 214 may be sealed with the plug 322. Further, the steps 404 to 408 may be repeated with the tool 292 installed in the second flange 258 of the second tube 246 in order to detect the leak in the second portion 234 of the fuel rail system 106.

Further, based on determination of the leak not present in the second portion 234 of the fuel rail system 106, the tool 292 may be shifted to the second flange of the third tube. The steps 404 to 408 may be repeated with the tool 292 installed in the second flange of the third tube in order to detect the leak in the third portion 272 of the fuel rail system 106. It should be noted that the method 400 described in steps 402 to 408 may be repeated with successive portions of the fuel rail system 106 to identify one or more leaks in one or more portions of the fuel rail system 106.

Also, in the installed position of the tool 292 within the second flange 226 of the first tube 214, the first passage 308 is in fluid communication with the first annular groove 264 and the first tube outer passage 222. During operation of the engine 100, the outer passages of the first portion 202 of the fuel rail system 106 may be pressurized with the inert gas at a working pressure. The working pressure may be higher that the predefined pressure threshold associated with the sealing element 314. Accordingly, the working pressure of the pressurized inert gas may act on the sealing element 314 through the first tube outer passage 222, the first annular groove 264, and the first passage 308.

Due to the higher working pressure, the sealing element 314 may be moved to the lifted position along the axis X-X' away from the seat 312 in turn venting the pressurized inert gas through the seat 312 and the second passage 310. As a result, the pressure of the inert gas within the outer passages of the first portion 202 may not reach the working pressure in turn indicating to an operator presence of the tool 292 within the fuel rail system 106. It should be noted that the venting of the pressurized inert gas through the tool 292 above the predefined pressure threshold may be applicable in the installed position of the tool 292 in any of the second flanges 226, 258 associated with the first tube 214, the second tube 246, the third tube, and so on.

The leak detection tool 292 provides a simple, effective, time efficient, and labor efficient method of performing the leak test of the fuel rail system 106. As a result, a need for disassembling various portions of the fuel rail system 106 for performing the leak test may be eliminated in turn limiting a possibility of introducing a new leak within the fuel rail system 106. Also, the leak detection tool 292 includes the sealing element 314 within the tool 292 thus limiting the possibility of operating the fuel rail system 106 with the tool 292 installed therein. The leak detection tool 292 may be used with existing fuel rail systems with minor modifications to the system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A double walled fuel rail system comprising:
   a first portion including a first inner tube, a first outer tube surrounding the first inner tube, and a first outer fluid passage disposed between the first inner tube and the first outer tube;
   a second portion coupled to the first portion, the second portion including a second inner tube, a second outer tube surrounding the second inner tube, and a second outer fluid passage disposed between the second inner tube and the second outer tube; and
   a leak detection tool disposed between the first portion and the second portion, the leak detection tool including:
      a body having a first end and a second end distal with respect to the first end;
      a first fluid passage extending from the first end at least partially towards the second end, the first fluid passage being defined inside the body;
      a second fluid passage axially aligned with and extending from the first fluid passage towards the second end, the second fluid passage being defined inside the body;
      a seat defined at an intersection of the first fluid passage and the second fluid passage;
      a sealing element provided in association with the seat within the second fluid passage; and
      a spring element provided within the second fluid passage and in contact with the sealing element, the spring element configured to move the sealing element between a seated position and a lifted position,
   wherein the first end of the leak detection tool is configured to completely block fluid communication between the first outer fluid passage and the second outer fluid passage of the double walled fuel rail system when the leak detection tool is disposed in the double walled fuel rail system between the first portion and the second portion of the double walled fuel rail system.

2. The double walled fuel rail system of claim 1, wherein the first fluid passage is in fluid communication with the second fluid passage in the lifted position of the sealing element.

3. The double walled fuel rail system of claim 1, wherein the first fluid passage is fluidly disconnected with respect to the second fluid passage in the seated position of the sealing element.

4. The double walled fuel rail system of claim 1, wherein the first fluid passage is in fluid communication with only one of the first outer fluid passage and the second outer fluid passage.

5. The double walled fuel rail system of claim 1, wherein a first diameter defined by the first fluid passage is smaller with respect to a second diameter defined by the second fluid passage.

6. The double walled fuel rail system of claim 1, wherein the leak detection tool further includes an end piece provided within the second fluid passage, the end piece configured to contact and hold the spring within the second fluid passage.

7. The double walled fuel rail system of claim 6, wherein the end piece includes a through hole therein in fluid communication with the second fluid passage.

8. The double walled fuel rail system of claim 1,
   wherein the leak detection tool is configured to be disposed within a flange provided between the first portion and the second portion,
   wherein the flange includes a first annular groove in fluid communication with the first outer fluid passage and a second annular groove in fluid communication with the second outer fluid passage, and
   wherein the first end of the leak detection tool is configured to completely block fluid communication between the first annular groove and the second annular groove.

9. The double walled fuel rail system of claim 8, wherein the flange includes a bore adapted to receive the leak detection tool, the bore provided in communication with the first annular groove and the second annular groove.

10. The double walled fuel rail system of claim 8, wherein the first annular groove is disposed at an offset with respect to the second annular groove.

11. A method for performing a leak test of a double walled fuel rail system when an internal combustion engine associated with the double walled fuel rail system is not operating, the double walled fuel rail system having a first outer fluid passage provided in fluid communication with a second outer fluid passage associated with a first portion and a second portion respectively, the method comprising:
    providing a leak detection tool between the first outer fluid passage and the second outer fluid passage;
    completely blocking the fluid communication between the first outer fluid passage and the second outer fluid passage of the double walled fuel rail system by the leak detection tool provided between the first outer fluid passage and the second outer fluid passage of the double walled fuel rail system;
    pressurizing the first outer fluid passage with a pressurized fluid; and
    detecting a leak within the first outer fluid passage, which is associated with the first portion of the double walled fuel rail system, based on a pressure drop within the first outer fluid passage.

12. The method of claim 11 further including:
    providing fluid communication between a first fluid passage of the leak detection tool and the first outer fluid passage;
    pressurizing the first outer fluid passage with the pressurized fluid above a predefined threshold;
    lifting a sealing element of the leak detection tool with respect to a seat based on the pressurizing; and
    venting the pressurized fluid through the seat.

\* \* \* \* \*